US010445862B1

(12) United States Patent
Merry et al.

(10) Patent No.: US 10,445,862 B1
(45) Date of Patent: Oct. 15, 2019

(54) EFFICIENT TRACK-BEFORE DETECT ALGORITHM WITH MINIMAL PRIOR KNOWLEDGE

(71) Applicant: National Technology & Engineering Solutions of Sandia, LLC, Albuquerque, NM (US)

(72) Inventors: Kyle Merry, Albuquerque, NM (US); Ross L. Hansen, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 278 days.

(21) Appl. No.: 15/407,104

(22) Filed: Jan. 16, 2017

Related U.S. Application Data

(60) Provisional application No. 62/286,682, filed on Jan. 25, 2016.

(51) Int. Cl.
| | |
|---|---|
| *G06T 7/20* | (2017.01) |
| *G06T 7/246* | (2017.01) |
| *G06T 5/00* | (2006.01) |
| *G06T 7/35* | (2017.01) |
| *G06F 17/16* | (2006.01) |
| *G06F 17/11* | (2006.01) |
| *G06F 16/2453* | (2019.01) |

(52) U.S. Cl.
CPC ............... *G06T 5/004* (2013.01); *G06T 7/20* (2013.01); *G06T 7/251* (2017.01); *G06T 7/35* (2017.01); *G06F 16/24545* (2019.01); *G06F 17/11* (2013.01); *G06F 17/16* (2013.01)

(58) Field of Classification Search
CPC .... G06F 17/11; G06F 17/16; G06F 17/30469; G06T 5/004; G06T 7/35
See application file for complete search history.

(56) References Cited

U.S. PATENT DOCUMENTS

| | | | | |
|---|---|---|---|---|
| 6,825,885 | B2 * | 11/2004 | Bottreau | H04N 19/517 348/404.1 |
| 8,265,160 | B2 * | 9/2012 | Al-Kadi | G06T 7/238 375/240.01 |

(Continued)

OTHER PUBLICATIONS

Estrela et al. ("Pel-Recursive Motion Estimation Using the Expectation-Maximization Technique and Spatial Adaption," WSCG 2004, Feb. 2-6, 2003).*

(Continued)

*Primary Examiner* — Yubin Hung
(74) *Attorney, Agent, or Firm* — Samantha Updegraff; Medley, Behrens & Lewis, LLC (57) ABSTRACT

Apparatus, system and method for tracking an image target in a system, wherein a system receives an image comprising a plurality of pixels. The received image is processed via a plurality of different recursive motion model kernels in parallel to provide a plurality of kernel outputs, wherein each of the motion model kernels may include a respective pixel mask. Per-pixel energy is estimated of at least some of the plurality of kernel outputs. Velocity of at least one of the image pixels may also be estimated by generating a directional energy vector for each motion model kernel. The per-pixel energy and velocity estimates are fused to produce a fused estimate representing at least some of the motion model kernels for the image.

18 Claims, 11 Drawing Sheets

(56) References Cited

U.S. PATENT DOCUMENTS

| | | | | |
|---|---|---|---|---|
| 8,457,208 B2* | 6/2013 | Gish | ............ | H04N 19/51 375/240.15 |
| 2006/0159311 A1* | 7/2006 | Bober | ............ | G06T 7/262 382/107 |
| 2009/0316786 A1* | 12/2009 | Bosma | ............ | H04N 19/56 375/240.16 |
| 2009/0322956 A1* | 12/2009 | Chappalli | ............ | G06T 7/0012 348/699 |
| 2010/0165210 A1* | 7/2010 | Tappermann | ............ | H04N 19/533 348/699 |
| 2011/0142369 A1* | 6/2011 | Aila | ............ | H04N 5/23232 382/284 |
| 2012/0221273 A1* | 8/2012 | Furukawa | ............ | G01S 7/003 702/94 |
| 2014/0205013 A1* | 7/2014 | Kim | ............ | H04N 19/56 375/240.16 |
| 2015/0036737 A1* | 2/2015 | Puri | ............ | H04N 19/61 375/240.02 |
| 2016/0161607 A1* | 6/2016 | Turner | ............ | G01S 13/726 342/146 |

OTHER PUBLICATIONS

Pesquet-Popescu et al. ("Motion Estimation Techniques," published 2013, downloaded from https://pdfs.semanticscholar.org/98ca/f8325abb40aa6bbddd0e7f5d3a6c366d03e6.pdf).*

Musmann et al. ("Advances in picture coding," Proceedings of the IEEE, vol. 73, No. 4 , Apr. 1985).*

Beric et al. ("A Technique for Reducing Complexity of Recursive Motion Estimation Algorithms," IEEE Workshop on Signal Processing Systems, Aug. 27-29, 2003).*

Huang et al. ("Motion and structure from feature correspondences: A review," Proc. IEEE, vol. 82, pp. 252-268, Jul. 1997).*

De Haan et al. ("True-motion estimation with 3-D recursive search block matching," IEEE Transactions on Circuits and Systems for Video Technology, vol. 3, No. 5, Oct. 1993).*

Yang et al. ("Real-Time Implementation of Obstacle Detection Algorithms on a Datacube Max PCI Architecture ," Real-Time Imaging 8, 2002).*

Barniv Y, "Dynamic Programming Solution for Detecting Dim Moving Targets," IEEE Transactions on Aerospace and Electronics Systems, vol. AES-21, No. 1, pp. 144-156 (Jan. 1985).

Carnie R, et al., "Image Processing Algorithms for UAV 'Sense and Avoid'," pp. 2848-2853, Proceedings of the 2006 IEEE International Conference on Robotics and Automation Orlando, Florida—May 2006.

Dey D, et al., "A Cascaded Method to Detect Aircraft in Video Imagery," The International Journal of Robotics Research, Aug. 10, 2011 (http://ijr.sagepub.com/content/early/2011/08/09/0278364911412807).

Yang M, et al., "Real-Time Implementation of Obstacle Detection Algorithms on a Datacube Max PCI Architecture," Real-Time Imaging 2002; 8:157-72.

* cited by examiner

EFFICIENT TRACK-BEFORE DETECT ALGORITHM WITH MINIMAL PRIOR KNOWLEDGE

RELATED APPLICATIONS

The present application claims priority to U.S. Provisional Patent Application No. 62/286,682, filed Jan. 25, 2016, entitled "Efficient Track-Before-Detect Algorithm with Minimal Prior Knowledge", the entirety of which is incorporated by reference herein for all purposes.

GOVERNMENT RIGHTS

This invention was made with Government support under Contract No. DE-AC04-94AL85000 between Sandia Corporation and the U.S. Department of Energy. The Government has certain rights in the invention.

BACKGROUND

Target tracking systems, such as electro-optical and/or infrared (IR) systems, cover a wide range of distinct technologies based on the targets and the desired characteristic to be tracked. For example, tracking of celestial objects may involve the use of light in the visible spectrum and/or IR bands. Other types of optical detection may depend on heat (e.g., from exhaust), which produces significant radiation in the infrared (IR) spectral region. A spectral band choice may also be affected by changes and variations of atmospheric transmission and scattering. In the area of Unmanned Aerial Vehicles (UAVs), optical sensing and tracking for sense-and-avoid systems have become very important areas of research and development.

Target tracking techniques may generally be divided into point target tracking and fully imaged target tracking. For point targets, one of the challenges in target tracking is to extract or detect a target from a complex and cluttered background. For fully imaged targets (e.g., a vehicle on a road) the contrast between the target and background may be an important parameter. The detection of targets with low signal-to-noise ratio (SNR) is a key research challenge for modern computer vision systems. Track-before-detect (TBD) algorithms approach the problem by delaying detection decisions until after motion is captured, wherein the tracking occurs across multiple video frames—a feature critical for targets where any individual frame may contain insufficient information to distinguish signal from noise. Current state-of-the-art track-before-detect algorithms include particle filtering, which allows the target state distribution to be maintained and updated through Monte Carlo methods across frames, and velocity matched filters, which search over a space of velocity hypotheses and match an expected target profile against the image frames. Both techniques are capable of detecting targets with very low SNR in ideal conditions. However, both are computationally burdensome and too complex to perform well in a real-time processing environment.

BRIEF DESCRIPTION OF THE FIGURES

Various features, nature and advantages may become apparent from the detailed description set forth below when taken in conjunction with the drawings in which like reference characters identify correspondingly throughout.

DETAILED DESCRIPTION

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
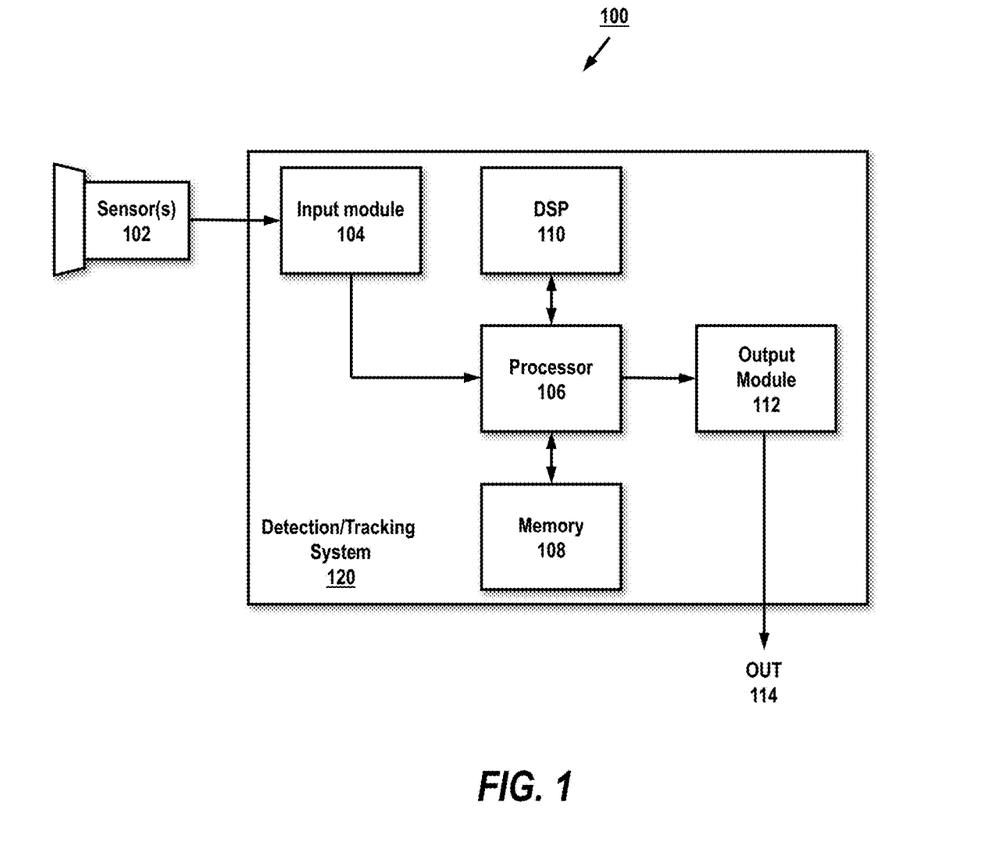
FIG. 1 shows one or more sensors coupled to a detection and tracking system including an input module, processor, memory, digital signal processing (DSP) and an output module that may be configured to carry out tracking and detection techniques under illustrative embodiments.

Turning to FIG. 1, a system 100 is shown for object tracking and detection utilizing any of the embodiments disclosed herein. In some illustrative embodiments, one or more sensors 102 may be operatively coupled to a detection/tracking system 120, configured to perform detection and tracking and also utilizing Recursive Estimation of Velocities, Energies, and Locations (REVEAL) techniques described in greater detail below. In one illustrative embodiment, sensor 102 may be configured as a staring sensor (also known as a staring array, staring-plane array, focal-plane array (FPA), or focal-plane) operating as an image sensing device comprising an array, such as a rectangular array, of light-sensing pixels at the focal plane of a lens. Staring sensor 102 is configured for imaging purposes (e.g. video imagery), but can also be configured for non-imaging purposes such as spectrometry, LIDAR, and wave-front sensing.

For imaging applications, sensor 102 may be configured as a two-dimensional image sensing device, such as CCD (charge-coupled device) and CMOS image sensor in the visible spectrum. Sensor 102 operates by detecting photons at particular wavelengths and then generating an electrical charge, voltage, or resistance in relation to the number of photons detected at each pixel. This charge, voltage, or resistance is then measured, digitized, and used to construct an image of the object, scene, or phenomenon that emitted the photons.

Images from sensor 102 are provided to detection and tracking system 120, which may include an input module 104 for receiving and processing images. Input module may include circuitry such a video decoder that may be configured to convert base-band analog video signals to digital components video. The input signals from sensor 102 to a video decoder may be analog video that conforms to a standard format such as NTSC or PAL. The output digital video from video module 104 may be formatted in various ways, such as 8-bit or 16-bit 4:2:2, 12-bit 4:1:1, or BT.656. In addition to the digital video output bus, a video decoder for input module 104 may also generate appropriate clock signal and other signals such as sync signals, blanking signals, field signals and lock signals, among others.

Signals from input module 104 may be provided to processor 106 directly (e.g., as part of a system-on-a-chip (SoC) architecture), or via an interface, such as a peripheral component interface (PCI). The processor 106 may be configured with DSP functions, and/or be configured with a separate DSP 110 coupled via a bus or other suitable connection as shown in FIG. 1. Illustrative examples of a suitable DSP 110 include fixed-point and/or floating point DSPs (e.g., the TMS320DM642 Video/Imaging Fixed-Point DSP, and/or other DaVinci video processors produced by Texas Instruments). Processor 106 may be coupled to a memory 108 configured to store data, as well as executable instructions for target detection, tracking and any other related processing functions. The memory 108 may also include an operating system (e.g., Darwin, RTXC, LINUX, UNIX, OS X, WINDOWS, or an embedded operating system such as VxWorks) including various software components and/or drivers for controlling and managing general system tasks (e.g., memory management, storage device control, power management, etc.) and facilitates communication between various hardware and software components. As the processor 106 performs functions relating to target tracking and detction, outputs and signals may be provided to the output module 112 via bus or peripheral connection, which in turn provides that output 114 to other systems and/or devices.

As mentioned above, conventional track-before-detect algorithms process change-detected image frames. That is, they consume the output of a separate algorithm which attempts to remove the static content of a scene, leaving only targets of interest embedded in a noise field. However, in real-world applications there will likely be scene residuals, or "clutter", present in the change-detected frames. The present disclosure shows technologies and algorithms that advantageously suppress noise and clutter energy in order to perform real-time, low-SNR target detection, referred to herein as recursive estimation of velocities, energies, and locations, or "REVEAL". Technologies based on REVEAL provide dynamic programming, based on a track-before-detect approach in illustrative embodiment, which identify targets possessing unknown and loosely constrained motion models. These technologies may generate estimates of their energy, velocity, and location while reducing the effects of clutter and noise.

Figure 2:
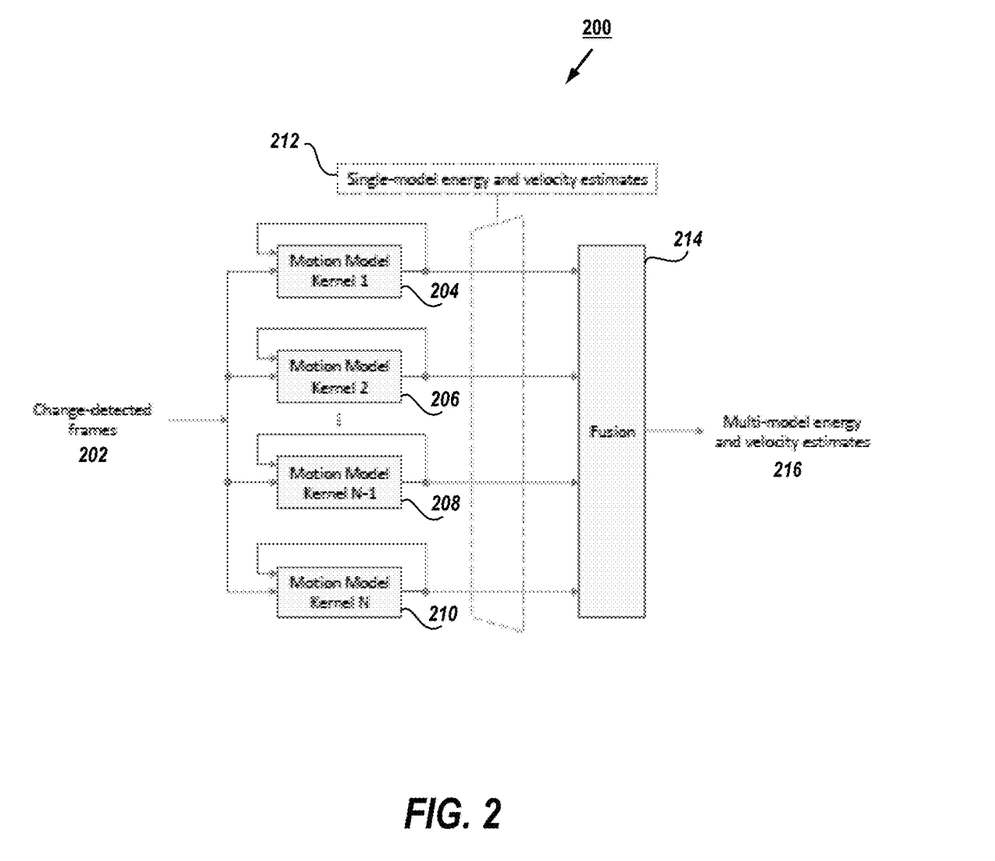
FIG. 2 shows an operative environment for recursive estimation of velocities, energies, and locations (REVEAL) that may be operative on the system of FIG. 1, where the environment includes one or more motion model kernels configured to receive data from change-detected frames, and subjected to energy and velocity estimation and fusion processing under an illustrative embodiment.

Turning to FIG. 2, the example shows an operative environment for recursive estimation of velocities, energies, and locations (REVEAL) that may be operative on the system of FIG. 1, where the environment includes one or more motion model kernels (204-210) configured to receive data in parallel from change-detected frames (202), and subject the data to energy and velocity estimation 212 and fusion processing 214 under an illustrative embodiment to produce multi-model energy and velocity estimates 216. As can be seen in the figure, change detected frames 202 (e.g., 2 or 3-dimensional data stream) are received (e.g., via 102, 104) and may be subjected to pre-processing by a change-detection or background-subtraction algorithm, such that the remaining data is comprised of noise, clutter, and targets. In the embodiment of FIG. 2, an example of REVEAL's operation on a stream of two-dimensional images, each comprising N×M pixels, is provided. The plurality of motion-searching kernels of 204-210 may be configured to independently process the input stream in parallel, via independent motion-searching kernels. In some illustrative embodiments, each of the REVEAL kernel components is configured to search the data stream for targets conforming to its specific motion model, and outputs per-pixel velocity and energy estimates for every video frame that it receives and processes.

The motion models and assumptions for each kernel may be configured in different ways, as well as how the kernels estimate target velocities and pixel energies via module 212. Regarding pixel energy estimates, one of the useful outputs of each motion-searching kernel (e.g., 204-210) includes a per-pixel energy estimate. This is an image whose pixel values can be determined by finding the largest estimated intensity of any possible target that could be in a pixel (i,j) in a frame k that conforms to a kernel's motion model.

Another useful output of the motion-searching kernels (e.g., 204-210) include a per-pixel velocity estimate via module 212. This estimate may be determined from a pair of images (for the x and y components of velocity), whose pixel values can be calculated by determining the estimated velocity of the target having the largest estimated intensity in a pixel (i,j) of a frame k. Illustrative computations of pixel energy estimates and per-pixel velocity estimates are discussed in greater detail below.

In each kernel, the kernel motion model may be represented by a pixel mask that covers the possible target movements between consecutive frames under the motion assumptions of that kernel. While it is possible to choose a single generalized motion model that will capture all possible targets, a number of factors make such a configuration less than optimal, compared to multiple specific motion models. First, a specific motion model may not find as much energy in "noise targets" as a more general one, which may improve the SNR of true targets. These models are already much more general than "constant velocity" or "constant acceleration" models used in similar applications, permitting a wide range of maneuvers. Furthermore, as targets often accelerate slowly, relative to the frame rate of the video stream, they will often conform to a particular, specific, motion model for many frames at a time. As such, an individual motion model does not need to capture all possible targets. Accordingly, in some illustrative embodiments, a set of individually specific motion models may be selected, whose motion hypotheses, considered together via fusion module 214, cover a vast majority of possible targets of interest.

Examples of illustrative inter-frame motion models and hypotheses are shown in the embodiments of FIGS. 3A-3E. In the illustrative embodiment of FIG. 3A, a group of kernels including four pixel masks (302-308) are shown covering a specific motion model set. When combined, the four pixel masks cover targets which move by one pixel or less in any direction. Mask 302, illustrated as shaded pixels, may include the target pixel (shown as dotted line) and movements in the upward and upward-diagonal directions. Mask 304 may include the target pixel and movements in the left and left-diagonal directions. Mask 306 may include the target pixel and movements in the downward and downward-diagonal directions. Mask 308 may include the target pixel and movements in the right and right-diagonal directions.

Figure 3A:
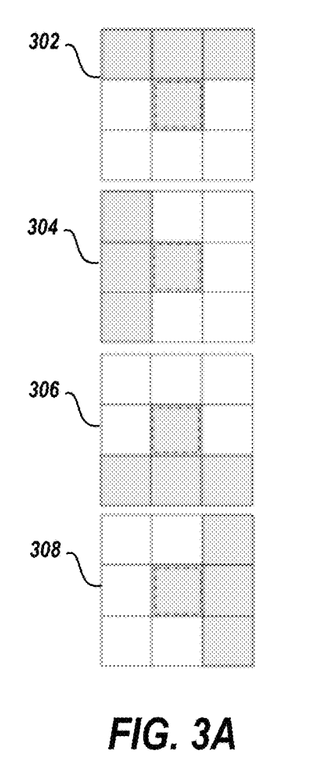
FIG. 3A shows an example of motion kernels forming a motion model, where, in each pixel mask, the dotted pixel represents an original target location, and shaded pixels represent possible destination pixels of the target after movement under an illustrative embodiment.
Figure 3B:
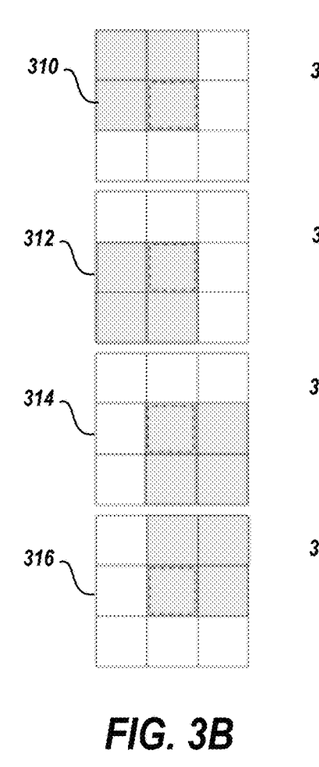
FIG. 3B shows another example of motion kernels forming a motion model, where, in each pixel mask, the dotted pixel represents an original target location, and shaded pixels represent possible destination pixels of the target after movement under an illustrative embodiment.
Figure 3C:
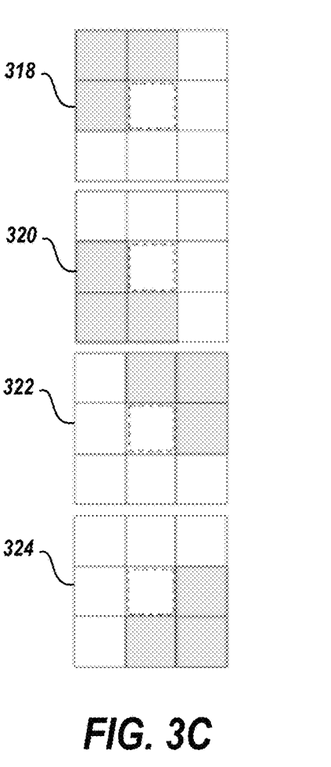
FIG. 3C shows a further example of motion kernels forming a motion model, where, in each pixel mask, the dotted pixel represents an original target location, and shaded pixels represent possible destination pixels of the target after movement under an illustrative embodiment.
Figure 3D:
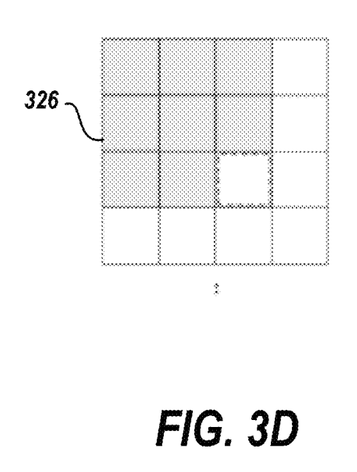
FIG. 3D shows a still further example of motion kernels forming a motion model, where, in each pixel mask, the dotted pixel represents an original target location, and shaded pixels represent possible destination pixels of the target after movement under an illustrative embodiment.

In the example of FIG. 3B, Mask 310, similarly illustrated as shaded pixels, may include the target pixel (shown as dotted line) and movements in the upward, left, and upward left-diagonal directions. Mask 312 may include the target pixel and movements in the left, downward and downward left-diagonal directions. Mask 314 may include the target pixel and movements in the right, downward and downward right-diagonal directions. Mask 316 may include the target pixel and movements in the right, upward and upper right-diagonal directions. The example of FIG. 3C shows a similar group of kernels as that of FIG. 3B, except that the pixel masks do not include the previous target location (dotted line). Thus, mask 318, similarly illustrated as shaded pixels, may include the movements in the upward, left, and upward left-diagonal directions. Mask 320 may include movements in the left, downward and downward left-diagonal directions. Mask 322 may include movements in the right, downward and downward right-diagonal directions. Mask 324 may include movements in the right, upward and upper right-diagonal directions. In the configuration of FIG. 3C, the kernel's motion model is configured to assume that the target travels to a new pixel in each frame, and would not capture the motion of a stationary or slow-moving (sub-pixel velocity) target.

Figure 3E:
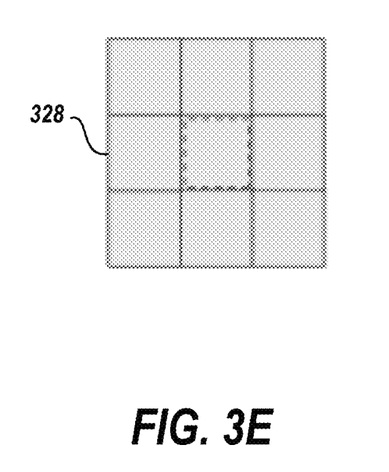
FIG. 3E shows a still further example of motion kernels forming a motion model, where, in each pixel mask, the dotted pixel represents an original target location, and the motion model utilizes the entire pixel area for determining movement.

It should be understood by those skilled in the art that the embodiments of FIGS. 3A-3C are merely examples, and that a multitude of other motion models and masks are contemplated in the present disclosure. For example, in the embodiment of FIG. 3D, a mask 326 may be applied to cover target movements that may span two or more pixels in a particular direction that may or may not (as shown in the figure) include the previous target location (shown as dotted line). In the example of FIG. 3E, the entire pixel area may be covered by the mask as shown.

Figure 4:
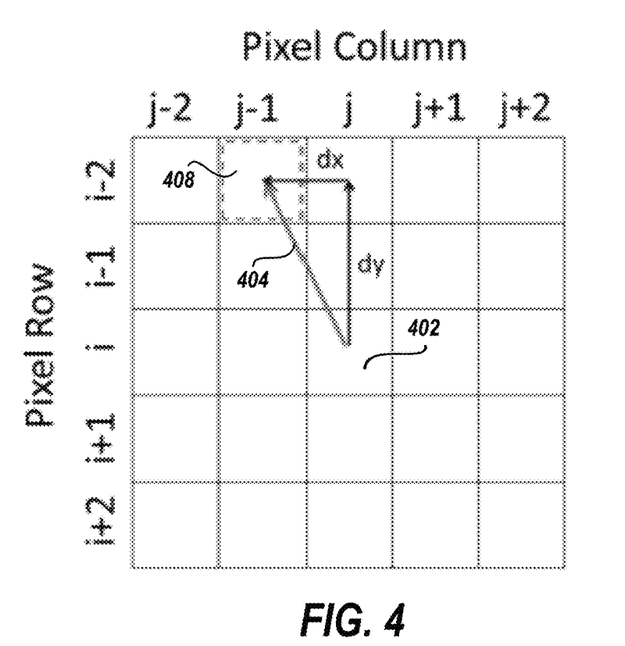
FIG. 4 shows energy and velocity estimates for pixel columns and rows for an image frame under an illustrative embodiment.

FIG. 4 shows an illustrative example of tracking a target across pixel rows (i+2, i+1, i, i−1, i−2) and columns (j−2, j−1, j, j+1, j+2). Utilizing any of inter-frame motion model using masks 302, 304, 310 and/or 318 under a single or multi-pixel (e.g., FIG. 3D) configuration, a target (i, j) may be tracked from its initial location 402 to a subsequent location 408 traversing in direction 404, where the corresponding pixel travel may be determined from dy and dx. By utilizing different kernel groups (e.g., FIG. 3B), a target that changes direction significantly will be covered under different masks before and after the change in velocity. The present disclosure may readily continue tracking the target, as long as the target's maneuvers are slow relative to the frame rate of the video stream. In such cases, the fusion processing (e.g., via 214) of REVEAL will combine the independent kernels and the target's estimated state will be maintained seamlessly even as its motion is transferred between kernels.

A portion of the target tracking under the present disclosure relies on performing dynamic processing to update image frames from one to the next. Under some illustrative embodiments, a dynamic-programming update technique is disclosed herein that is based on a tracking system based on choosing the brightest neighbor. In one example, if a stream of k video frames is received, each kernel (e.g., 204-210) may process these frames and produce per-pixel energy estimates (e.g., via 212) for frame k−1. Given the kernel's motion model (represented by its pixel mask), each pixel may have an associated pixel neighborhood. That is, if a target is in a given pixel at frame k, the motion model may define which pixels the target could possibly have been in at frame k−1. The "brightest neighbor" may be considered the pixel in this set which has the largest pixel energy estimate at frame k−1. During operation, the energy and location of the brightest neighbor may be processed and detected for each pixel, and those values may be used to compute new energy and velocity estimates for frame k. The details of this computation is discussed in greater detail below.

Once the brightest neighbor of every pixel has been found, REVEAL updates its energy and velocity estimates using a recursive algorithm. In some illustrative embodiments, the update processing may be performed by assuming that the brightest possible target from the neighborhood of pixel (i,j), frame k−1 has moved to pixel (i,j) in frame k. In such a case, the new energy and velocity estimates may be determined for the target. In one example, if the brightest neighbor of pixel (i,j) at frame k−1 is at pixel (i+dx,j+dy), the pixel's $k^{th}$ frame energy and velocity estimates may be calculated using the following:

| Variable | Description |
|---|---|
| $E_k(i, j)$ | Energy estimate for frame k, pixel (i, j) |
| $I_k(i, j)$ | The $k^{th}$ change-detected frame of the input stream |
| $V_{x,k}(i, j)$ | x component of velocity estimate for frame k, pixel (i, j) |
| $V_{y,k}(i, j)$ | y component of velocity estimate for frame k, pixel (i, j) |
| $\alpha_e$ | Energy estimate forgetting factor, $0 \le \alpha_e < 1$ |
| $\alpha_v$ | Velocity estimate forgetting factor, $0 \le \alpha_v < 1$ |
| dx | x component of the difference between the target location in frame k and in frame k − 1 |
| dy | y component of the difference between the target location in frame k and in frame k − 1 |

$$E_k(i, j) = \alpha_e E_{k-1}(i + dx, j + dy) + (1 - \alpha_e) I_k(i, j) \quad (1)$$
$$V_{x,k}(i, j) = \alpha_v V_{x,k-1}(i + dx, j + dy) + (1 - \alpha_v) dx \quad (2)$$
$$V_{y,k}(i, j) = \alpha_v V_{y,k-1}(i + dx, j + dy) + (1 - \alpha_v) dy \quad (3)$$

As discussed above, the equations are fully recursive, requiring only the current frame and the last frame's energy and velocity estimates in order to compute the new energy and velocity estimates. The update steps are also computationally inexpensive, requiring only O(n) computations, where n is the number of pixels in a frame, and they are independent computations that can be done in parallel (e.g., via 204-210). As a result, the algorithm and processing is advantageously suited to high performance real-time and streaming applications.

While the update algorithm is somewhat simple, it also has powerful emergent behavior. In other words, each pixel's energy estimate value may be qualitatively interpreted as an estimated intensity of the brightest target that could possibly be in that pixel at a given time, constrained by the motion model. In areas where there are no targets, the pixel values may converge to a low-variance estimate of the background noise's local mean. In areas around a target conforming to the motion model, there may be a "cloud" of higher intensity values (see, e.g., FIGS. 6A-6D), representing the intensities of different possible target trajectories. Generally, a target tends to be at, or near, the brightest pixel in the cloud. At any rate, the variances of any noise in the scene are significantly reduced, greatly improving the SNR of the targets.

Figure 5:
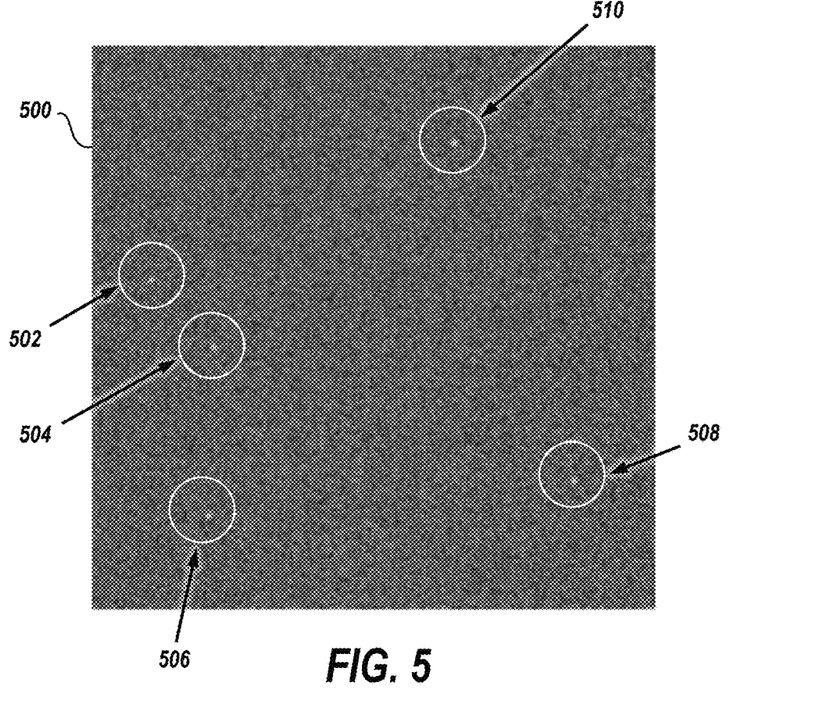
FIG. 5 shows a reproduced image frame that includes a single, change-detected frame with five targets under an illustrative embodiment.
Figure 6A:
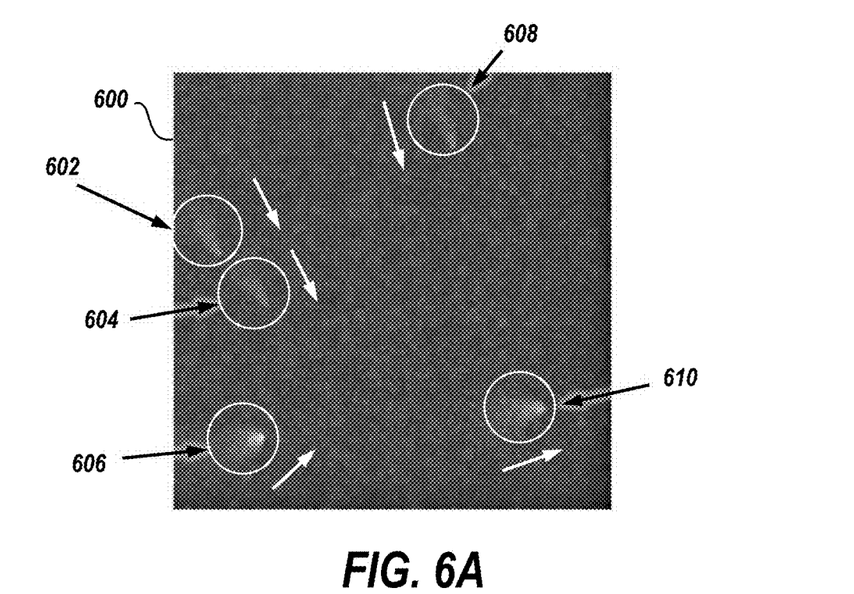
FIGS. 6A, 6B, 6C and 6D show reproduced images of kernel results from processing the input stream with four (4) kernel motion models, under illustrative embodiments.
Figure 6B:
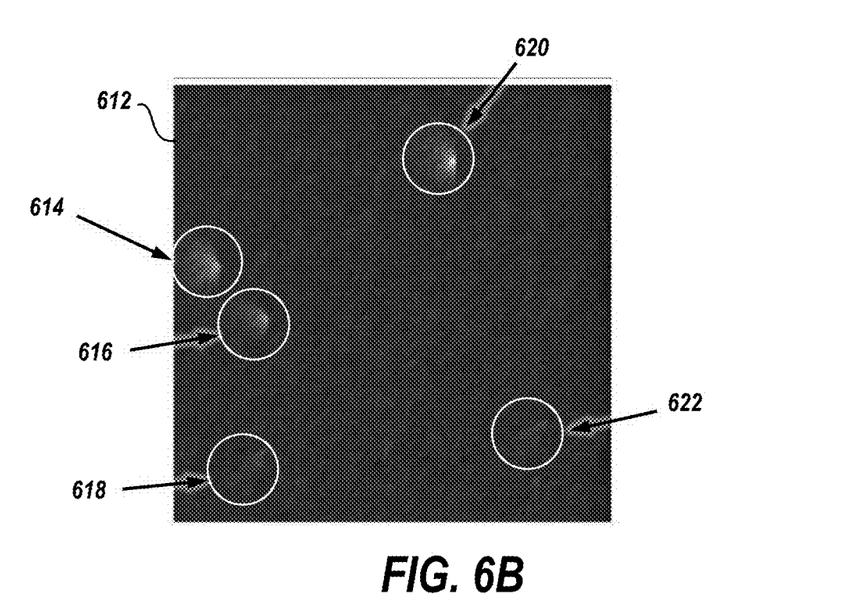
Figure 6C:
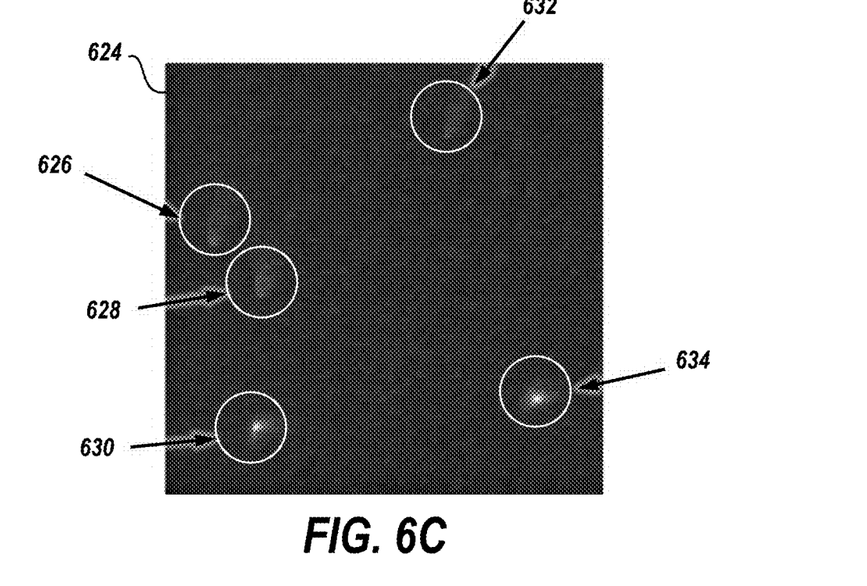
Figure 6D:
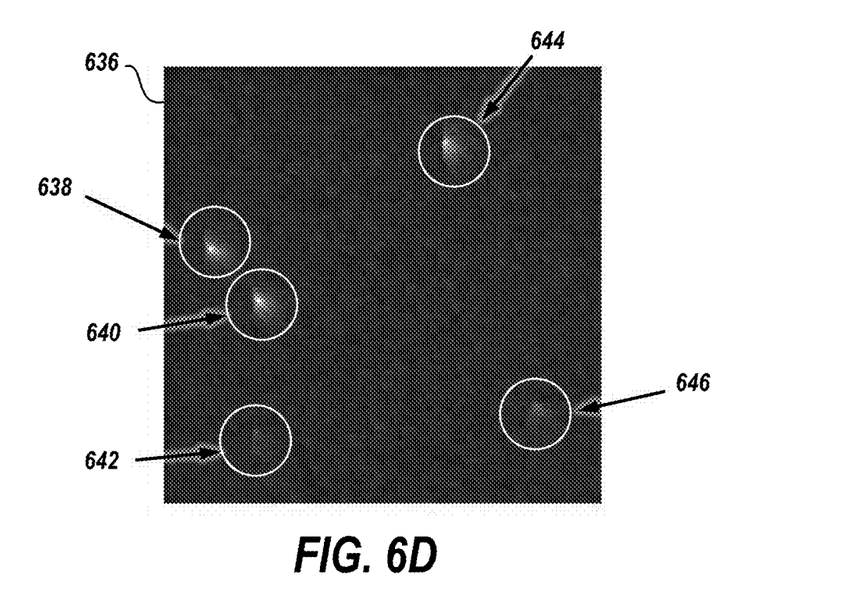
Figure 7:
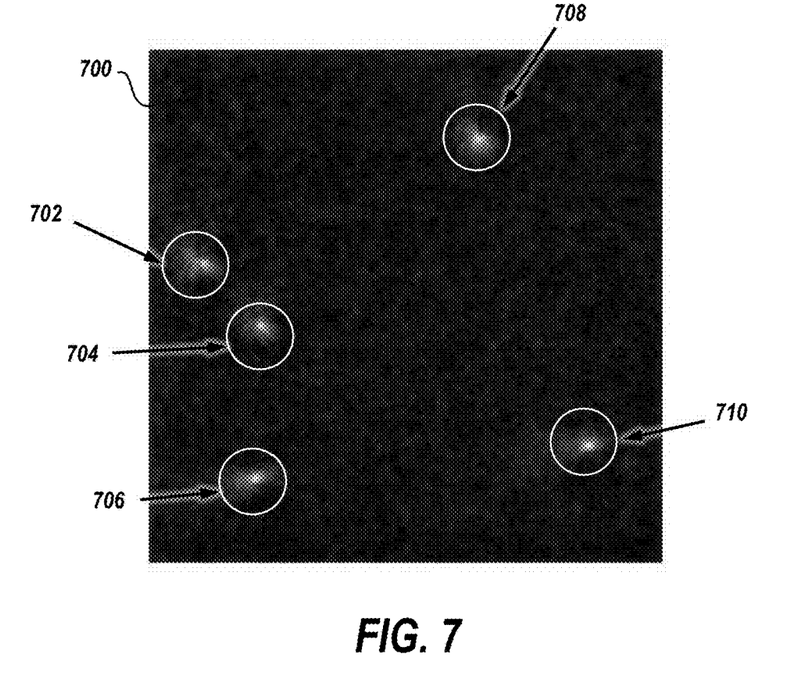
FIG. 7 shows a reproduced image of max-minus fusion, with target velocities ranging between 0.4 and 1.0 pixel/frame under an illustrative embodiment.

FIG. 5 shows an initial image frame 500 representing a single frame of the change-detected input stream that includes 5 (five) targets 502-510, while FIGS. 6A-6D show individual kernel outputs for that frame under illustrative embodiments. In FIG. 6A the image kernel output 600 show the targets 602-610 after being subjected to a first kernel motion model (e.g., FIG. 3B 310), where it may be seen from the target trail or "cloud" estimated target directions (shown as a white line in the figure). FIG. 6B shows another image kernel output 612, showing the targets 614-622 after being subjected to another kernel motion model (e.g., FIG. 3B 312); FIG. 6C shows another image kernel output 624, showing the targets 626-634 after being subjected to another kernel motion model (e.g., FIG. 3B 314); and FIG. 6D shows another image kernel output 636, showing the targets 638-646 after being subjected to another kernel motion model (e.g., FIG. 3B 316).

Once the kernels have updated their estimates for a frame, the estimates are fused together (e.g., via 214) to produce one estimate that represents all motion models (e.g., 204-210). Those skilled in the art will recognize that a plurality of suitable algorithms are possible, but preferred embodiment may rely on processes that preserve the signal content of the true targets while suppressing energy from clutter sources. In some illustrative embodiments, the processes may act independently per pixel and per frame. That is, the fused energy Ek at frame k, pixel (i,j) may be considered a function of the energies $E_k^m$ and velocities $V_k^m$ at frame k, pixel (i,j). In the examples provided below, the present disclosure will not specify pixel or frame indices of the values being computed, with the understanding that the operation is to be applied to every pixel of every frame.

Generally speaking, the fused energy value of a pixel may be considered the difference between the largest and smallest energy estimates of all motion models for that pixel. The velocity estimate may be considered the velocity estimate of the model that had the largest energy for that pixel. Under such configurations, a max-minus-min fusion algorithm, such as the one shown below, may be applied:

| Variable | Description |
|---|---|
| $E^m$ | Energy estimate for motion model m |
| $\vec{V}^m$ | Velocity estimate for motion model m |
| $m_x$ | Index of the motion model with the largest energy for this pixel |
| $m_n$ | Index of the motion model with the smallest energy for this pixel |
| $\mathbb{E}$ | Fused energy estimate |
| $\vec{\mathbb{V}}$ | Fused velocity estimate |
| $m_x = \underset{m}{\mathrm{argmax}}(E^m)$ | |
| $m_n = \underset{m}{\mathrm{argmin}}(E^m)$ | |
| $\mathbb{E} = E^{m_x} - E^{m_n}, \vec{\mathbb{V}} = \vec{V}^{m_x}$ | |

Figure 8:
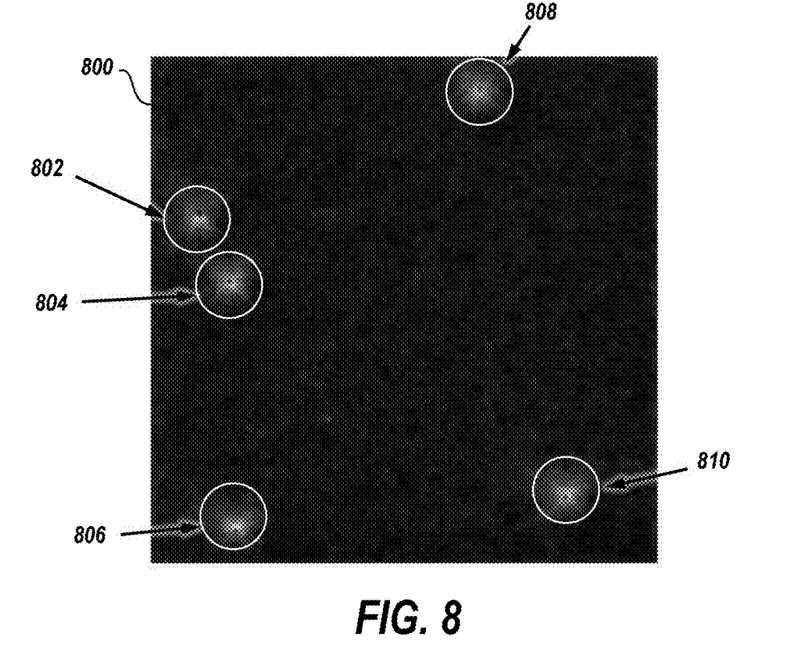
FIG. 8 shows a reproduced image of max-minus fusion, with target velocities ranging between 0.1 and 0.3 pixel/frame, where the max-minus fusion overcorrects slow-moving targets, introducing artifacts.
Figure 9:
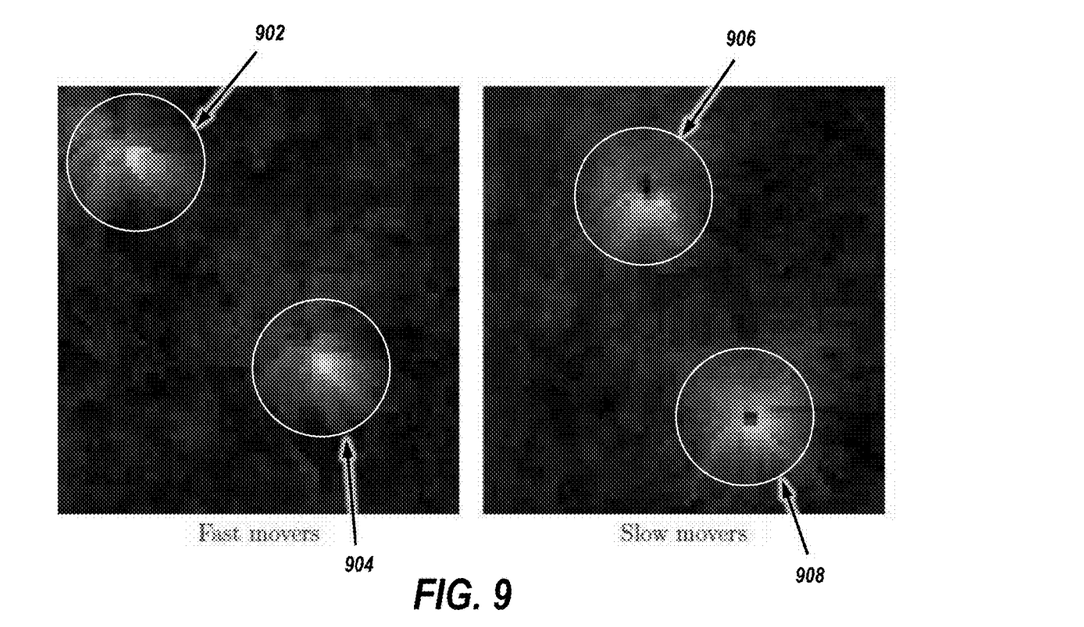
FIG. 9 shows reproduced images illustrating a comparison of max-minus fusion results for fast or slow moving targets, where slow moving targets develop a visible artifact.
Figure 10:
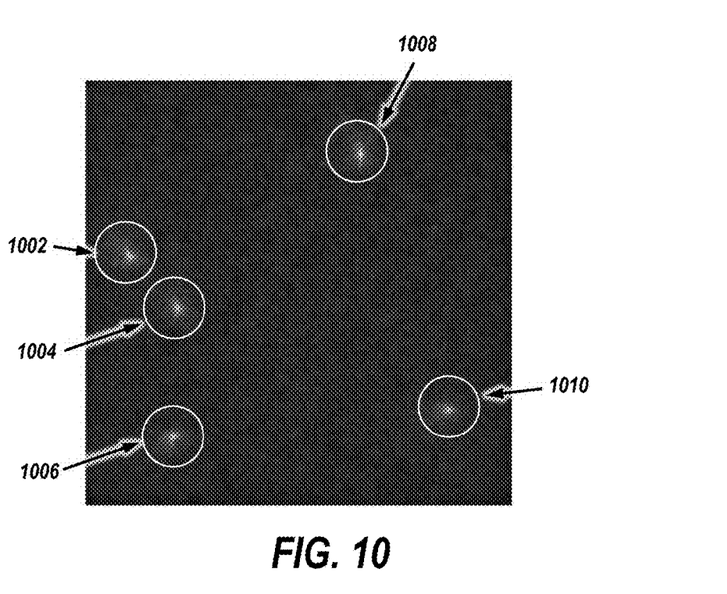
FIG. 10 shows a reproduced image illustrating velocity fusion, with target velocities ranging between 0.4 and 1.0 pixel/frame under an illustrative embodiment.

As can be appreciated by those skilled in the art, the he max-minus-min fusion algorithm is simple to implement, yet effective at suppressing clutter. An example of the max-minus-min fusion algorithm applied to the targets associated with the embodiment of FIG. 5 are depicted as 802-810 in the image 800 of FIG. 8. While certain advantages are evident from such configurations, slow-moving targets may experience suppression as shown in FIGS. 9 and 10, where it can be seen that the fast moving targets 902, 904 exhibit a more distinct trail or cloud as compared to the slow moving targets 906, 908 of FIG. 9. An illustrative image frame of slow moving targets 1002-1010 are shown in FIG. 10.

In addition to max-minus fusion, other fusion algorithms may be utilized to combine energy and/or velocity estimates. In an illustrative embodiment, velocity fusion may be used to process energy/velocity estimates and produce a fused energy/velocity estimate. The velocity fusion processing may include the following:

| Variable | Description |
|---|---|
| $E^m$ | Energy estimate for motion model m |
| $\vec{V}^m$ | Velocity estimate for motion model m |
| $m_x$ | Index of the motion model with the largest energy for this pixel |
| $\mathbb{E}$ | Fused energy estimate |
| $\vec{\mathbb{V}}$ | Fused velocity estimate |
| $v_x^m$ | x component of $\vec{V}^m$ |
| $v_y^m$ | y component of $\vec{V}^m$ |
| $\vec{W}^m$ | 3D velocity vector for motion model m |
| $\vec{\mathbb{M}}$ | 3D "directional energy" vector |
| $m_x = \underset{m}{\mathrm{argmax}}(E^m)$ | |
| $\vec{W}^m = \begin{bmatrix} v_x^m \\ v_y^m \\ 1 \end{bmatrix}$ | |
| $\vec{\mathbb{M}} = \sum_{m=0}^{N} \frac{\vec{W}^m}{|\vec{W}^m|} E^m$ | |
| $\mathbb{E} = |\vec{\mathbb{M}}|, \vec{\mathbb{V}} = \vec{V}^{m_x}$ | |

Generally speaking, velocity estimation and fusion may involve creating a "directional energy" vector for each motion model, where the velocity estimate from that model is extended into three dimensions and weighted by the model's energy estimate. These vectors are then summed to produce the net "directional energy" vector $\vec{\mathbb{M}}$.

Figure 11:
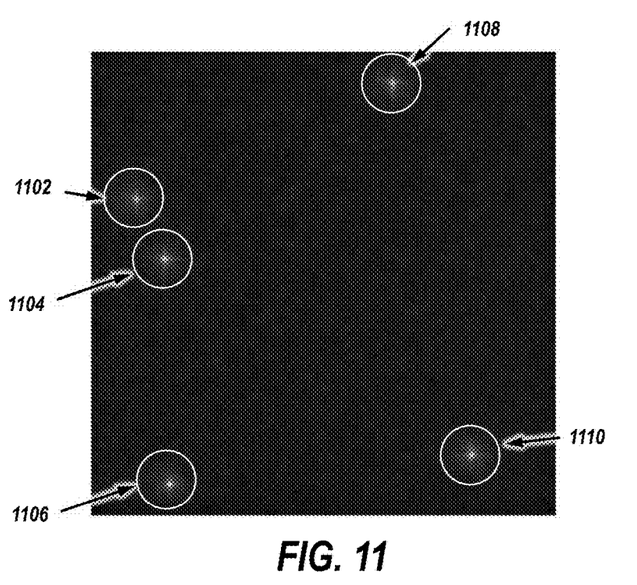
FIG. 11 shows a reproduced image illustrating velocity fusion, with target velocities ranging between 0.1 and 0.3 pixel/frame, demonstrating that velocity fusion excels at slow-moving targets.
Figure 12:
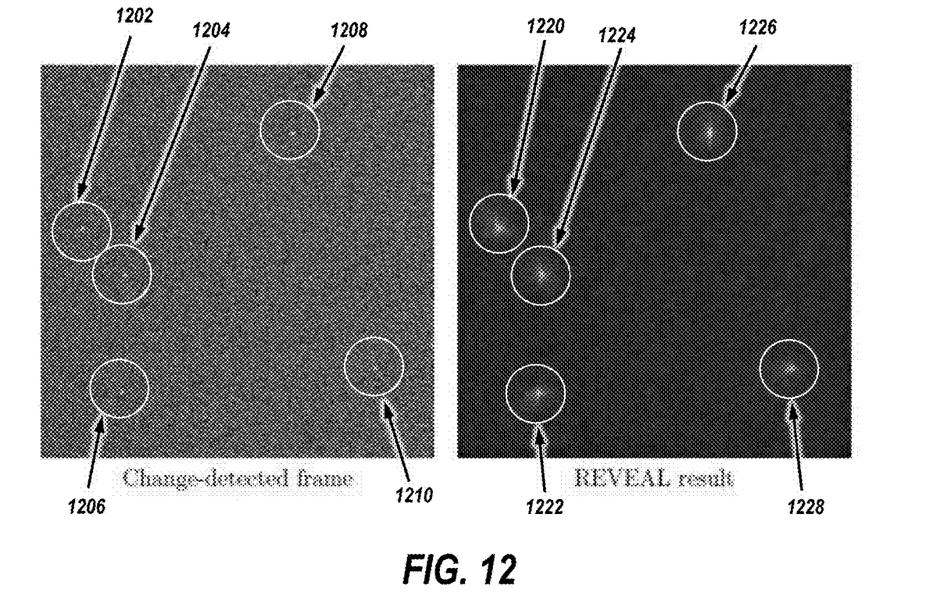
FIG. 12 shows reproduced images demonstrating results showing improved SNR from input to output of REVEAL under an illustrative embodiment.

In some illustrative embodiments, an assumption is made that true targets will tend to have a strong energy trend in one or two motion models, allowing those vectors to dominate the "noise" vectors from the other motion models. Clutter, on the other hand, will tend to be strong in all models, and will tend to negate itself in vector space. Velocity fusion reduces the artifacts created by max-minus-min fusion, and is particularly good at preserving slow-moving targets, as shown in FIGS. 11 and 12. FIG. 11 shows a reproduced image illustrating velocity fusion, with target velocities for targets 1102-1110 ranging between 0.1 and 0.3 pixel/frame, demonstrating that velocity fusion excels at slow-moving targets. FIG. 12 shows reproduced images demonstrating results showing improved SNR from input (1202-1210) to output (1220-1228) of REVEAL targets under an illustrative embodiment.

Figure 13:
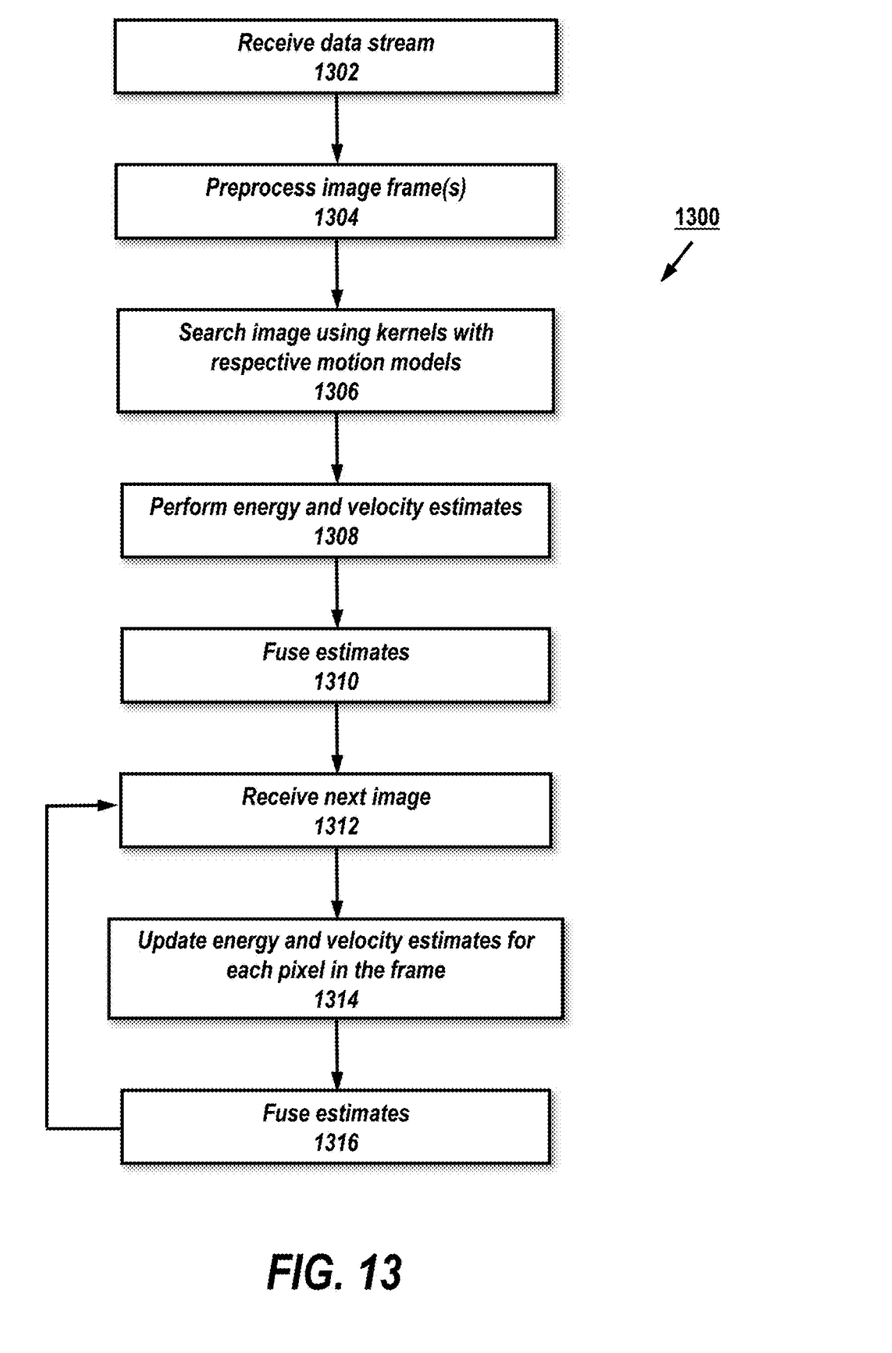
FIG. 13 shows a process for REVEAL under an illustrative embodiment.

Turning to FIG. 13, an illustrative process is shown for REVEAL processing as disclosed herein under an illustrative embodiment. In block 1302 data streams are captured or received in an imaging system (e.g., 100) and may be subjected to pre-processing for the image frame in block 1304. The pre-processing may include, but is not limited to, change-detection, background subtraction, or other suitable technique. Depending on the images being received, the pre-processing block may be optional under some illustrative embodiments. In block 1306, the system may search the image frame using kernels with respective motion models. The motion-searching kernels (e.g., 204-210) may be configured to independently process the input stream, via independent motion-searching kernels, where each of the kernel components is configured to search the data stream for targets conforming to its specific motion model (e.g., FIGS. 3A-3C), and outputs per-pixel velocity and energy estimates in block 1308 for every video frame that it receives and processes. The estimates are then fused as discussed above in block 1310 to combine the kernels. As a subsequent image is received in block 1312, the process 1300 updates the energy and velocity estimates using a recursive algorithm and fuses the estimates in block 1316.

In summary, the present disclosure illustrates that REVEAL's combination of independent motion-seeking kernels and a fusion step produce a stream of image frames qualitatively similar to the input stream, but with greatly improved signal-to-noise ratio. While some artifacts may still remain, which may complicate the discrimination of closely-spaced targets, it has been demonstrated herein that the technologies and techniques greatly improve the detectability of many low-SNR targets. The detectability improvements are often competitive with or exceeding the improvements from other track-before-detect algorithms, and the computational burden is greatly reduced. REVEAL enables real-time, uncued detection of targets that were previously only detectable in non-realtime or highly constrained environments.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The invention is claimed as follows:

1. A system for tracking a target in images, the system comprising:
    a processor;
    memory, operatively coupled to the processor, wherein the memory comprises computer-executable instructions;
    an output module, operatively coupled to the processor; and
    an input module, operatively coupled to the processor, for receiving a stream of change-detected images, wherein each of the change-detected images comprises a plurality of pixels, wherein each of the change-detected images has been processed to remove static objects therefrom;
    wherein the computer-executable instructions, when executed by the processor, cause the processor to perform a plurality of acts, comprising:
        processing the stream of change-detected images via a plurality of different recursive motion model kernels in parallel to provide a plurality of kernel outputs for a pixel of a change-detected image in the change-detected images, wherein each recursive motion model kernel has a respective motion model, and further wherein each recursive motion model kernel is configured to generate an output in the outputs that is indicative of whether the pixel represents a target that is moving in conformance with the respective motion model of the recursive motion model kernel, the output comprises a velocity estimate for the pixel and an energy estimate for the pixel; and
        fusing the plurality of kernel outputs to produce a fused estimate, wherein the fused estimate comprises a fused velocity estimate and a fused energy estimate that is indicative of motion of the target in the stream of change-detected images.

2. The system of claim 1, wherein the energy estimate is indicative of direction of movement of the target.

3. The system of claim 2, wherein the fused estimate comprises a highest estimated energy from among energy estimates in the kernel outputs.

4. The system of claim 1, wherein each of the motion model kernels comprise a pixel mask that covers possible target movements in accordance with a respective motion model of each of the motion model kernels.

5. The system of claim 1, wherein the processor is configured to fuse the plurality of kernel outputs via a max-minus-min fusion.

6. The system of claim 1, wherein the fused estimate comprises estimated velocity for the pixel, wherein the estimated velocity is indicative of direction of movement of the target.

7. A method for tracking a target in images, the method comprising:
    receiving, via an input module, a first change detection image corresponding to a first point in time and a second change detection image corresponding to a second point in time that is subsequent the first point in time, wherein the first change detection image and the second change detection image have been processed to remove static objects therefrom, wherein the first change detection image and the second change detection image have a plurality of pixels;
    processing, via a processor, the first change detection image and the second change detection image, wherein processing the first change detection image and the second change detection image comprises generating a plurality of kernel outputs for a first pixel in the second change detection image via a plurality of different recursive motion model kernels, wherein the outputs are based upon the first pixel in the second change detection image and a second pixel in the first change detection image, wherein the plurality of different recursive motion model kernels are representative of a plurality of different motion models, and further wherein the outputs comprise estimated velocities and estimated energies for the first pixel; and fusing, via the processor, the outputs to produce a fused estimate, wherein the fused estimate comprises a fused velocity estimate and a fused energy estimate that is based upon the estimated velocities and the estimated energies output by the plurality of different recursive motion model kernels, the fused estimate is representative of motion of the target between the first point in time and the second point in time.

8. The method of claim 7, wherein fusing the outputs comprises determining an estimated velocity that is highest from amongst the estimated velocities, wherein the fused velocity estimate is the estimated velocity that is highest.

9. The method of claim 7, wherein the processing of the received image in parallel via a plurality of different recursive motion model kernels comprises applying a pixel mask to the first change detection image and the second change detection image that covers possible movements of the target between the first point in time and the second point in time.

10. The method of claim 7, wherein the fusing of the outputs to produce a fused output comprises fusing the outputs via one of a max-minus-min fusion or a velocity fusion.

11. The method of claim 7, wherein the outputs comprise a directional energy vector for each recursive motion model kernel.

12. The method of claim 11, wherein fusing the outputs to produce the fused estimate comprises computing an estimated directional energy vector, the estimated directional energy vector being a difference between an estimated energy in the outputs with a highest magnitude and an estimated energy in the outputs with a lowest magnitude.

13. A computer-readable device comprising instructions that, when executed by a processor, cause the processor to perform acts comprising:

receiving, via an input module, a first change detection image corresponding to a first point in time and a second change detection image corresponding to a second point in time that is subsequent the first point in time, wherein the first change detection image and the second change detection image have been processed to remove static objects therefrom, wherein the first change detection image and the second change detection image have a plurality of pixels;

processing, via a processor, the first change detection image and the second change detection image, wherein processing the first change detection image and the second change detection image comprises generating a plurality of kernel outputs for a first pixel in the second change detection image via a plurality of different recursive motion model kernels, wherein the outputs are based upon the first pixel in the second change detection image and a second pixel in the first change detection image, wherein the plurality of different recursive motion model kernels are representative of a plurality of different motion models, and further wherein the outputs comprise estimated velocities and estimated energies for the first pixel; and fusing, via the processor, the outputs to produce a fused estimate, wherein the fused estimate comprises a fused velocity estimate and a fused energy estimate that is based upon the estimated velocities and the estimated energies output by the plurality of different recursive motion model kernels, the fused estimate is representative of motion of the target between the first point in time and the second point in time.

14. The computer-readable device of claim 13, wherein fusing the outputs comprises determining an estimated velocity that is highest from amongst the estimated velocities, wherein the fused velocity estimate is the estimated velocity that is highest.

15. The computer-readable device of claim 13, wherein the processing of the received image in parallel via a plurality of different recursive motion model kernels comprises applying a pixel mask to the first change detection image and the second change detection image that covers possible movements of the target between the first point in time and the second point in time.

16. The computer-readable device of claim 13, wherein the fusing of the outputs to produce a fused output comprises fusing the outputs via one of a max-minus-min fusion or a velocity fusion.

17. The computer-readable device of claim 13, wherein the outputs comprise a directional energy vector for each recursive motion model kernel.

18. The computer-readable device of claim 17, wherein fusing the outputs to produce the fused estimate comprises computing an estimated directional energy vector, the estimated directional energy vector being a difference between an estimated energy in the outputs with a highest magnitude and an estimated energy in the outputs with a lowest magnitude.

* * * * *